United States Patent [19]
Weiss et al.

[11] Patent Number: 5,510,834
[45] Date of Patent: Apr. 23, 1996

[54] METHOD FOR ADAPTIVE ESTIMATION OF UNWANTED GLOBAL PICTURE INSTABILITIES IN PICTURE SEQUENCES IN DIGITAL VIDEO SIGNALS

[75] Inventors: Peter Weiss, Hägersten; Björn Christensson, Bandhagen, both of Sweden

[73] Assignee: DV Sweden AB, Stockholm, Sweden

[21] Appl. No.: 318,734
[22] PCT Filed: Apr. 8, 1993
[86] PCT No.: PCT/SE93/00313
  § 371 Date: Oct. 13, 1994
  § 102(e) Date: Oct. 13, 1994
[87] PCT Pub. No.: WO93/21733
  PCT Pub. Date: Oct. 28, 1993

[30] Foreign Application Priority Data

Apr. 13, 1992 [SE] Sweden .................. 9201183

[51] Int. Cl.[6] .................. H04N 9/11; H04N 7/24
[52] U.S. Cl. .................. 348/97; 348/699
[58] Field of Search .................. 348/97, 96, 699, 348/402, 413, 416

[56] References Cited

U.S. PATENT DOCUMENTS

| | | | |
|---|---|---|---|
| 4,903,131 | 2/1990 | Lingemann et al. | 348/97 |
| 5,006,929 | 4/1991 | Barbero et al. | 348/420 |
| 5,043,810 | 8/1991 | Vreeswijk et al. | 348/399 |

FOREIGN PATENT DOCUMENTS

| | | |
|---|---|---|
| 0392671 | 10/1990 | European Pat. Off. . |
| 0458239 | 11/1991 | European Pat. Off. . |

Primary Examiner—Tommy P. Chin
Assistant Examiner—A. Au
Attorney, Agent, or Firm—Jacobson, Price, Holman & Stern

[57] ABSTRACT

A method for estimation of global error motion vectors, which represent unwanted global picture instabilities in a picture sequence in digital video signals. The method uses a motion vector estimator with an adaptively variable measuring time distance, as well as spatial processing and temporal processing, in order to estimate a sequence of global motion vectors, from which a sequence of global error motion vectors is separated in order to allow stabilization of a picture sequence in digital video signals.

8 Claims, 4 Drawing Sheets

VMV

METHOD FOR ADAPTIVE ESTIMATION OF UNWANTED GLOBAL PICTURE INSTABILITIES IN PICTURE SEQUENCES IN DIGITAL VIDEO SIGNALS

BACKGROUND OF THE INVENTION

The invention relates generally to a method for estimation of global error motion vectors, which represent unwanted global picture instabilities in a picture sequence in digital video signals. The method uses a number of selected reference windows as well as spatial processing (involving calculations based on information associated with one picture in the picture sequence), motion vector estimators (estimating global motion vectors or vector fields associated with complete pictures or local motion vectors associated with fractions of pictures, whereat, preferrably, a confidence value indicative of reliability of the estimation is assigned to every motion vector) using a specific measuring time distance (corresponding to the time elapsed between two pictures in the picture sequence, which are to be compared with regard to individual pixels in order to estimate inter-picture displacements yielding global or local motion vectors for one of the two pictures), as well as temporal processing (involving calculations based on information associated with several pictures in the picture sequence).

This is done in order to estimate a sequence of global motion vectors (represented by one two-dimensional motion vector per picture), from which a sequence of global error motion vectors (associated with the unwanted global picture instabilities and represented by one two-dimensional motion vector per picture) is separated. The sequence of global error motion vectors may be used for compensation of the unwanted picture instabilities to allow production of stabilized picture sequences. Due to e.g. bending and stretch of film originals the global motion vector may also be corrected locally within a picture in order to minimize picture distortion.

In general, motion in a picture sequence is a combination of object motion (associated with moving objects) and global motion. The global motion is a combination of true global motion (such as pan and zoom) and unwanted global picture instabilities resulting from, e.g., worn-out film sprocket holes, poorly performing telecine (device used in transfer of film to video), linear or non-linear stretch of film original during printing or copying, or unsteady camera shots. The true global motion, and the unwanted global picture instabilities may vary in amplitude and frequency. The variation in the amplitude may range from small to large (compared to picture spatial resolution) and the variation in the frequency may range from low to high (compared to picture temporal resolution), within the picture sequence. In the case of film stretch and bend the true global motion may differ within one picture, and thus the unwanted global motion will be described by a global error motion vector field for the entire picture.

The global motion may be represented by a sequence of global motion vectors, wherein the amplitude corresponds to a maximum length of the global motion vectors within a specific interval of the picture sequence. The maximum length may range from fractions of an inter-pixel distance to several times this distance, where large amplitudes correspond to large maximum length and small amplitude correspond to small maximum length. The frequency corresponds to the global motion vector frequency, i.e. the frequency content of the sequence of global motion vectors within the specific interval of the picture sequence, the global motion vector frequency ranging approximately from picture frequency resolution limit to fractions thereof.

Known methods for estimating global error motion vectors involve motion vector estimators using known motion vector estimation techniques such as, e.g., pixel gradient recursion, phase correlation, and block matching (see, e.g., PCT/SE92/00219), combined with spatial and temporal processing of the estimated motion vectors.

One difficulty in the motion vector estimators is to make accurate estimation of both large and small motion vectors. This is due to the fact that these motion vector estimators use a fixed measuring time distance, and that a small measuring distance is advantageous for the estimation of large motion vectors, whereas a large measuring distance is advantageous for the estimation of small motion vectors at low motion vector frequencies. The latter is a consequence of that the finest possible estimation of motion vectors is limited by picture resolution for a fixed measuring distance, provided that the motion vector frequency is low. These motion vector estimators thus give a compromise between the two cases, leading to limitations in accurate estimation of small global motion vectors at low motion vector frequences, which represent a type of global picture instabilities particularly critical to human visual reception, especially when mixing two or more picture sequences.

One difficulty in the spatial and temporal processing is to make a precise estimate of a global motion vector from estimated motion vectors associated with a picture in the picture sequence.

Another difficulty in spatial and temporal processing is to make a precise estimate of a global error motion vector from estimated the global motion vectors associated with a picture in the picture sequence. The precision of the estimate of the global error motion vector is dependent upon a filtering method used to separate global error motion vectors from global motion vectors associated with pictures in the picture sequence.

SUMMARY OF THE INVENTION

The present invention concerns an improved method, employing a local motion vector estimator, with a specific measuring time distance, combined with spatial processing, to determine global motion vectors, as well as temporal processing, to separate global error motion vectors from global true motion vectors, for the purpose of estimating global error motion vectors for a picture sequence in digital video signals in order to allow compensation of instabilities in the picture sequences.

One particular problem to be solved by a method according to the preamble of claim 1 is to allow accurate estimation of both large and small global error motion vectors down to sub-pixel resolution. This problem is solved by a method characterized in that the measuring distance used in the motion vector estimator is adapted according to a maximum motion vector length and to a motion vector frequency, within a specific interval of the picture sequence, the measuring distance being increased when only small motion vectors and low motion vector frequency are present and decreased when large motion vectors and/or high motion vector frequency are present.

Another problem to be solved by the method is to make a precise estimate of a sequence of global error motion vectors based on an estimated sequence of the global motion vectors associated with pictures in the picture sequence. This problem is solved by a method, described in claim 4, characterized in that a sequence of global motion vectors is processed by a temporal processor to separate global error motion vectors from global motion vectors, thus resulting in a sequence of global error motion vectors associated with the picture sequence.

Suitable further developments of the invention are defined in the dependent claims not yet mentioned and will be explained below.

BRIEF DESCRIPTION OF THE DRAWINGS

A preferred embodiment of the invention will be described below with reference to the accompanying drawings, wherein.

DESCRIPTION OF A PREFERRED EMBODIMENT

Figure 1:
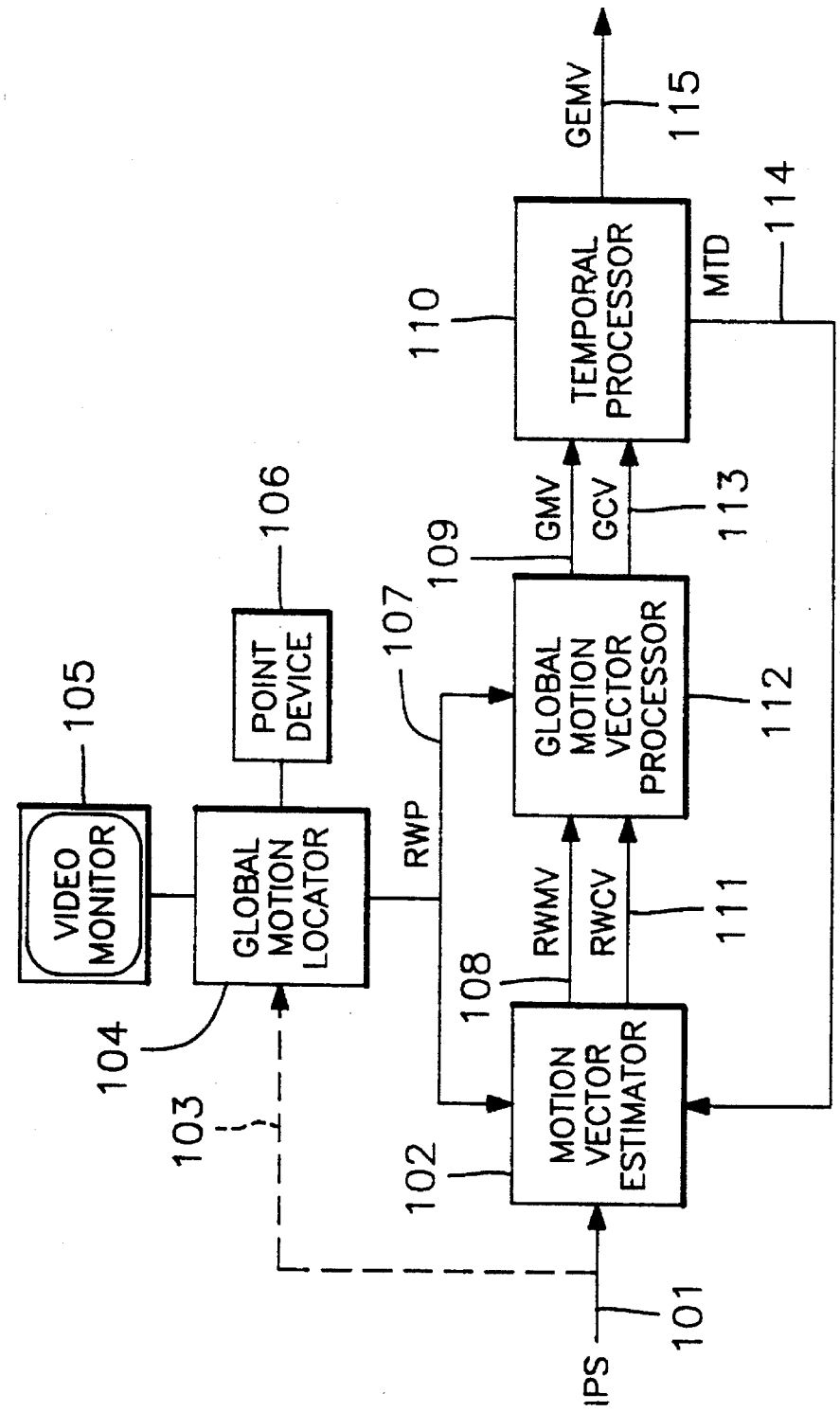
FIG. 1 shows a block diagram illustrating the principal functions of the method for estimation of global error motion vectors for an input picture sequence.

With reference to FIG. 1 a method for estimating unwanted global picture instabilities in an input picture sequence 101 will be described, using a motion vector estimator 102 with a variable measuring time distance 114. A global motion locator 104, to which a videomonitor 105 and a point device 106 are connected is used for selection of one or more reference windows and outputs a corresponding signal 107 to the motion vector estimator 102, which further includes an up-sampling function to allow sub-pixel measurement, within the reference window or windows, and a local motion vector estimator.

The motion vector estimator 102 produces motion vectors 108 for the reference window or windows with corresponding confidence values 111, and is combined with processing in a global motion vector processor 112, to determine global motion vectors 109 with corresponding confidence values 113 for an entire picture.

The method also includes temporal processing in a temporal processor 110, to continuously from the global motion vectors 109 with corresponding confidence values 113 determine a measuring time distance 114 for the motion vector estimator 102 and to separate true and unwanted global motion providing global error motion vectors 115 associated with the input picture sequence 101. The global error motion vectors 115 allow compensation of instabilities in the input picture sequence 101.

Figure 2A:
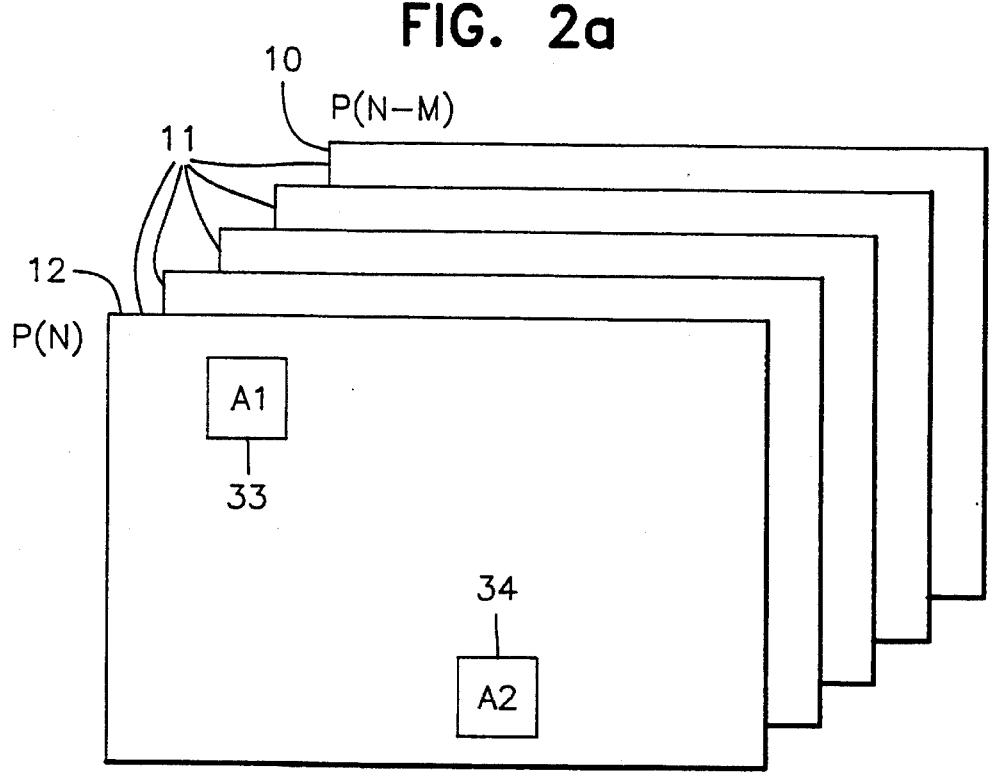
FIG. 2a shows several pictures of a picture sequence to be input to a motion vector estimator employing block matching technique. In the pictures one or more reference windows are selected, as shown in one of the pictures, where the reference windows consist of a number of pixels.
Figure 2B:
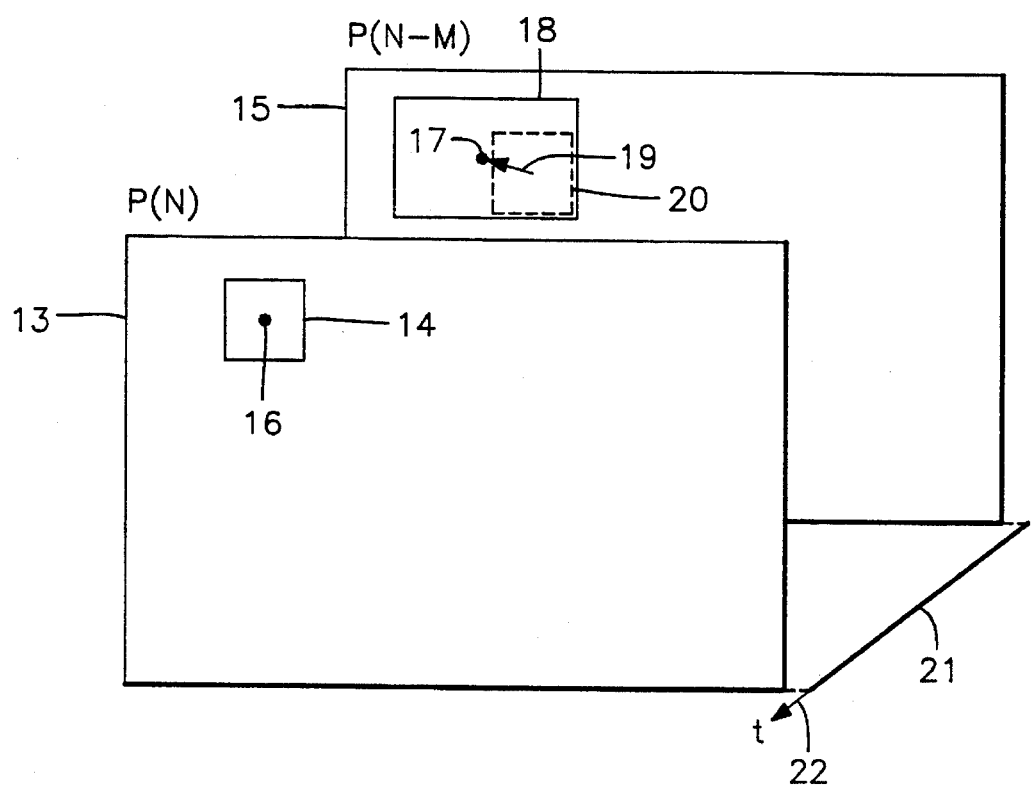
FIG. 2b shows two pictures of a picture sequence used in a local motion vector estimator employing block matching technique. A time axis illustrates the separation in time of the two pictures. In one of the pictures a block with a dot marking its center is shown. In the other picture a search area with a dot marking its center is shown. In the search area a possible motion vector and a block in a possible previous position, associated with the block of the first picture, are shown.

With reference to FIGS. 2a and 2b the principal function of a local motion vector estimator will be described. For the purpose of estimating a local motion vector for each one of pictures 11 in the picture sequence, two pictures P(N) 12 and P(N-M) 10 are regarded. The two pictures 13, 15 are separated in time by a measuring time distance (MD) 21, marked with a wider line segment on a time axis 22. The measuring distance (MD) 21 corresponds to an integer M, indicating the number of pictures from P(N) 12 to P(N-M) 10, divided by the picture frequency $f_p$ of the picture sequence (MD=M/$f_p$). In a current picture P(N) 13 one or more reference windows are selected (possibly even overlapping the edge of a picture), as shown for picture P(N) 12 and reference windows A1 33 and A2 34.

Such a window defining a block 14 (made up of a number of pixels) of the current consecutive picture P(N) 13, is assigned a selected motion vector, being one of a number of possible motion vectors 19 (only one is shown in FIG. 2b) within a search area 18, the search area is up-sampled a number of times, e.g. 16, to allow estimation of motion vectors with sub-pixel resolution, the selected motion vector corresponding to the most likely displacement of the block 14 from a position for a block 20 in the preceding picture 15 to a position 17 in the preceding picture 15, corresponding to a position 16 in the current picture 13.

The selected motion vector is assigned by calculating and minimizing a matching criterion (EM) based on e.g. difference in pixel light intensity between the block 14 of the current consecutive picture 13 and different blocks 20 (only one is shown in FIG. 2b) of the preceding consecutive picture 15. The matching criterion for the selected motion vector and those for motion vectors, close to the selected motion vector of the block, are compared. This gives a confidence value (CV) indicative of the quality of the selected motion vector of the block 14 in the current picture 13. Every measuring window of the current picture 13 is, in this manner, assigned an individual motion vector and an individual confidence value (CV) selected from a corresponding block.

The measuring time distance 21 may further be used in said motion vector estimator 102, when employing a fixed measuring cycle, for which a referred current picture is compared to a number of following pictures within the measuring time distance 21, said measuring cycle being followed by another measuring cycle referring to another current picture, which is separated from the previous current picture by a distance forward in time, corresponding to said measuring time distance 21.

Figure 3A:
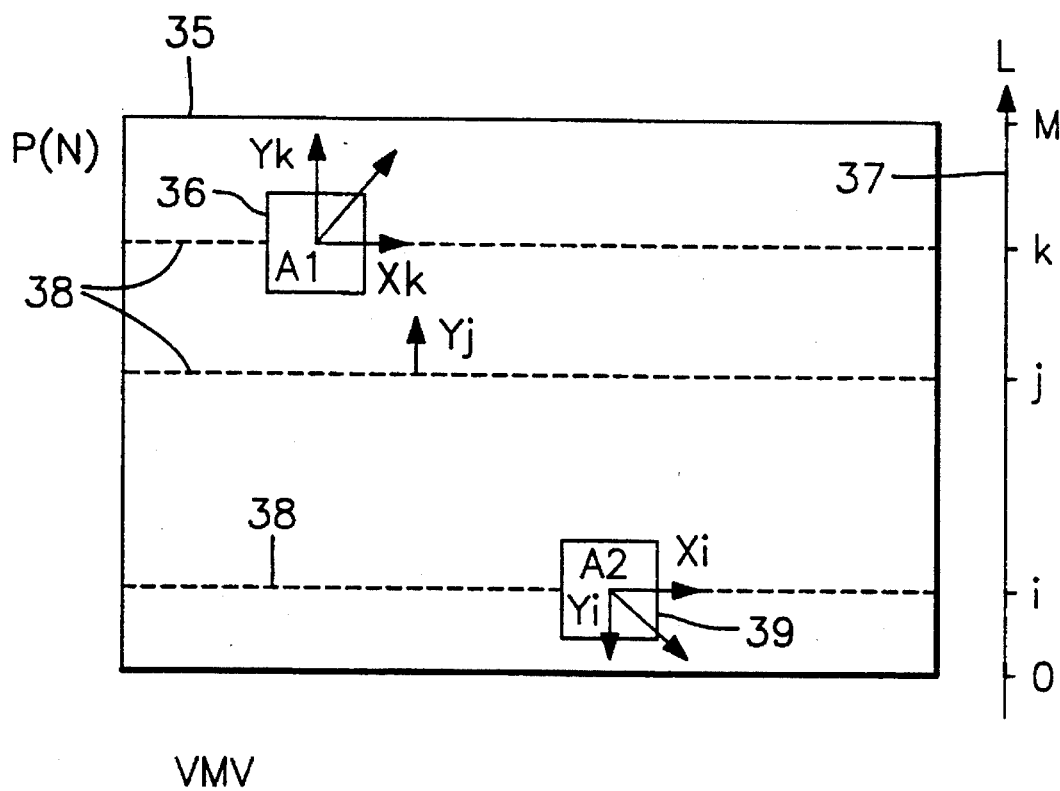
FIG. 3a shows in a picture two reference windows with corresponding motion vectors divided into components, lines in the picture, and a vertical scale indicating positions of the lines.
Figure 3B:
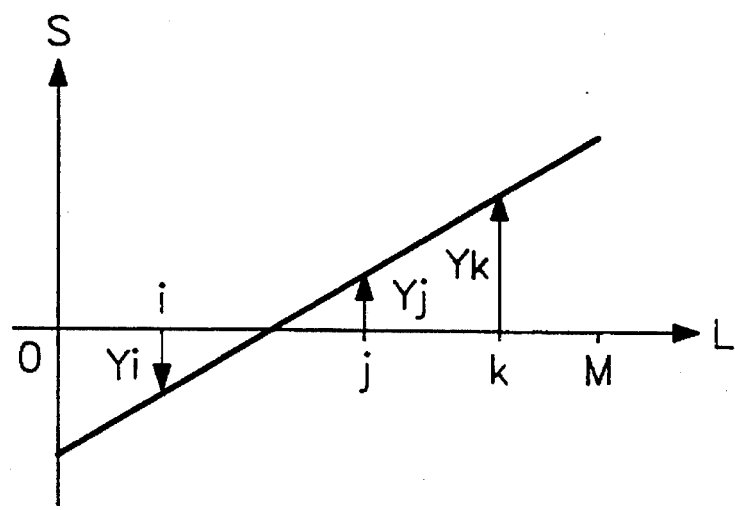
FIG. 3b illustrates spatial linear processing of motion vectors in one dimension to compensate the entire picture for vertical stretch.

With reference to FIGS. 3a and 3b the principal functions of a global motion vector estimator will be described. The resulting motion vector and confidence signal associated with one measuring window could represent the global motion vector although it is advantageous to have more than one reference window. The reason for this is that possible vertical stretch or horizontal bending which are superimposed on the global motion vector may be compensated locally. FIG. 3a shows two reference windows A1 36 and A2 39 with corresponding lines i 38, j 38, respectively, and a line k 38. As shown motion vector Yk is the estimated motion vector in reference windows A1 and a shown motion vector Yi is the estimated motion vector in reference window A2. Due to vertical stretch motion vector Yk and Yi may differ. FIG. 3b shows an example of spatial processsing in the form of linear vertical interpolation of motion vectors Yk and Yi to compensate vertical stretch. The global motion vector processor outputs a global motion vector or a global vector field for every picture in the picture sequence. An interpolation method may in this way be used for linear or non-linear compensation of both vertical and horizontal stretch or bending.

Figure 4A:
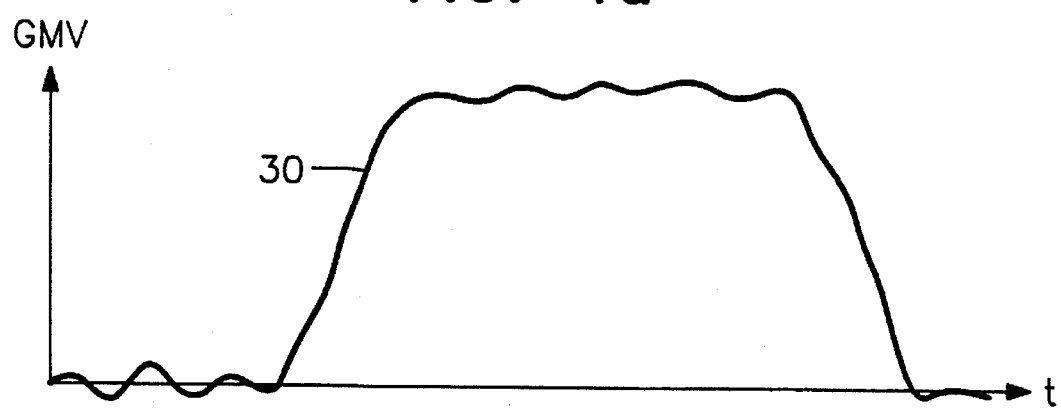
FIG. 4a shows a continuous curve corresponding to a sequence of global motion vectors associated with global motion in a picture sequence.
Figure 4B:
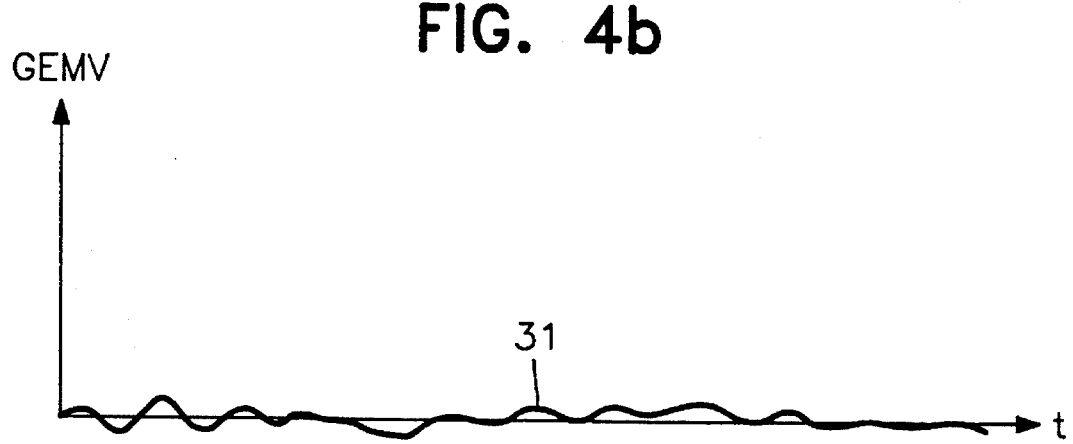
FIG. 4b shows a continuous curve corresponding to a sequence of global error motion vectors associated with unwanted global picture instabilities in a picture sequence.
Figure 4C:
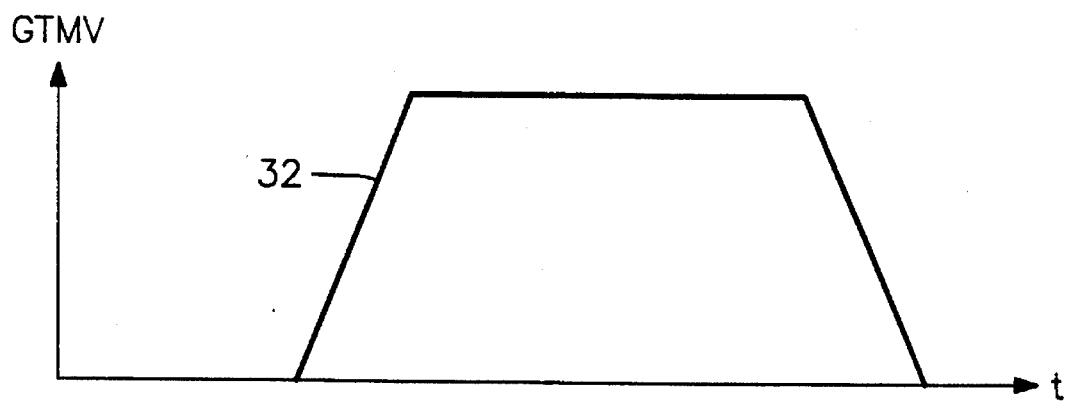
FIG. 4c shows a continuous curve corresponding to a sequence of true global motion vectors associated with true global motion in a picture sequence.

With reference to FIG. 4a, 4b, and 4c the principal function of a temporal processor is to be described. The sequence of global motion vectors 30 (or global motion vector fields) is input to the temporal processor which provides the local motion estimator with a measuring distance dependent on the characteristics of the sequence 30. Whenever the sequence 30 is low in maximum motion vector length and low in motion vector frequency, the measuring distance is increased by the temporal processor. This allows the local motion vector estimator to accurately estimate motion vectors corresponding to sub-pixel displacements between two immediatly consecutive pictures. This sub-pixel resolution is achieved even if no up-sampling is used to improve resolution in the motion vector estimator or further increased if sub-pixel motion estimation has been used. Also, to separate global error motion vectors 31 from global true motion vectors 32, the temporal processor processes the sequence of global motion vectors 30 and corresponding confidence values through, e.g., a digital adaptive filter with different critical frequencies continuously adapted to the frequency contents of the sequences of the unwanted and the true global motion vectors 31, 32. The temporal processor finally outputs a sequence of the global error motion vectors.

Although the invention has been described in conjunction with a preferred embodiment, it is to be understood that various modifications may be made without departing from the spirit and scope of the invention as defined by the appended claims.

We claim:

1. A method for estimation of global error motion vectors, which represent unwanted global picture instabilities in an input picture sequence (101) in digital video signals, by using a motion vector estimator (102) with a specific measuring time distance (21) between pictures in said picture sequence, as well as spatial processing and temporal processing, in order to estimate a sequence of global motion vectors (109), from which a sequence of global error motion vectors (115) is separated, characterized in that said measuring time distance (21) used in the motion vector estimator is adjusted in response to a maximum length of said global motion vectors (30) and to a motion vector frequency, within a specific interval of the picture sequence (1), said measuring time distance (21) being increased in case only small global motion vectors and low global motion vector frequency are present and being decreased in case large global motion vectors are present and in case a high global motion vector frequency is present.

2. A method as defined in claim 1, wherein said measuring time distance (21) is used in said motion vector estimator (102), when employing a fixed measuring cycle, for which a referred current picture is compared to a number of following pictures within the measuring time distance (21), said measuring cycle being followed by another measuring cycle referring to another current picture, which is separated from the previous current picture by a distance forward in time, corresponding to said measuring time distance (21).

3. A method as defined in claim 1, wherein information about the origin of said picture sequence is used, as well, in determination of said measuring time distance (21).

4. A method as defined in claim 1, wherein the motion vector estimator (102) uses at least one selected reference window (33, 34) for estimating inter-picture motion with sub-pixel resolution.

5. A method as defined in claim 4, wherein sub-pixel resolution is achieved in the motion estimator by up-sampling of said at least one reference window.

6. A method as defined in claim 4, wherein more than one selected reference window is used and wherein the sequence of global motion vectors (109) is corrected by interpolating motion vectors locally within a picture in order to compensate for stretch or bending within the picture.

7. A method as defined in claim 1, wherein a sequence of global motion vectors (109) is processed by a temporal processor to separate global error motion vectors (115) from said global motion vectors (109), thus resulting in a sequence of said global error motion vectors (115) associated with said picture sequence (101).

8. A method as defined in claim 7, wherein the temporal processor is an adaptive motion vector frequency sensitive recursive filter using global motion vectors for the picture sequence.

* * * * *